(12) United States Patent
Pawluk

(10) Patent No.: US 6,497,541 B2
(45) Date of Patent: Dec. 24, 2002

(54) CONVERTIBLE VEHICLE TRANSPORTING TRAILER

(76) Inventor: William Pawluk, 240 Woodside Rd., Airdrie, Alberta (CA), T4B 2E2

(*) Notice: Subject to any disclaimer, the term of this patent is extended or adjusted under 35 U.S.C. 154(b) by 0 days.

(21) Appl. No.: 09/909,945

(22) Filed: Jul. 23, 2001

(65) Prior Publication Data

US 2002/0012575 A1 Jan. 31, 2002

Related U.S. Application Data

(60) Provisional application No. 60/220,177, filed on Jul. 24, 2000.

(51) Int. Cl.$^7$ .................................................. B60P 3/08
(52) U.S. Cl. .............................. 410/26; 410/27; 410/28; 410/29.1
(58) Field of Search ................................ 410/4, 24, 26, 410/27, 28, 29.1

(56) References Cited

U.S. PATENT DOCUMENTS

| | | | |
|---|---|---|---|
| 3,880,457 A | 4/1975 | Jones, Jr. ................ | 410/29.1 |
| 3,913,496 A | 10/1975 | Lohr ........................ | 410/27 |
| 4,061,390 A | 12/1977 | Schall ...................... | 410/26 |
| 4,784,545 A | 11/1988 | Lawrence ................ | 410/26 |
| 4,786,222 A | 11/1988 | Blodgett .................. | 410/29 |
| 4,801,229 A | 1/1989 | Hanada et al. .......... | 410/26 |
| 4,881,859 A | 11/1989 | Ehrlich .................... | 410/29.1 |
| 5,096,216 A | 3/1992 | McCalla .................. | 280/414.1 |
| 5,332,345 A | 7/1994 | Lillard ..................... | 410/29.1 |
| 5,676,507 A | 10/1997 | Lugo ....................... | 410/29.1 |
| 5,755,540 A | 5/1998 | Bushnell .................. | 410/29.1 |
| 5,924,248 A | 7/1999 | Cox et al. ................ | 52/174 |
| 6,010,285 A | 1/2000 | Cox et al. ................ | 410/26 |
| 6,287,061 B1 * | 9/2001 | Tinnell .................... | 410/26 |
| 6,345,943 B1 * | 2/2002 | Lawson et al. .......... | 410/29.1 |

FOREIGN PATENT DOCUMENTS

| | | | | |
|---|---|---|---|---|
| EP | 0 001 364 | * | 4/1979 | .......... 410/26 |
| GB | 1249859 | | 10/1971 | |
| GB | 2 136 365 A | * | 9/1984 | .......... 410/27 |
| JP | 356 008725 A | * | 1/1981 | .......... 410/26 |
| JP | 361 050843 A | * | 3/1986 | .......... 410/24.1 |

* cited by examiner

Primary Examiner—D. Glenn Dayoan
Assistant Examiner—Paul Chenevert

(57) ABSTRACT

A convertible vehicle transporting trailer has rigid upper and lower decks. The upper deck is mounted onto the lower deck by selectively actuable, releasably lockable telescopic stanchions. The stanchions are actuable by actuators so as to raise and lower the upper deck over the lower deck between a lowered position, an intermediately elevated position, and a fully elevated position. In the fully extended position the upper deck is elevated above the lower deck so as to allow loading of vehicles or freight onto the lower deck. In the intermediately elevated position the upper deck is below the fully elevated position so as to be snugly adjacent uppermost extremities of the vehicles or freight on the lower deck. In the lowered position the upper deck rests on a mid-section of the lower deck and on elevated wheel-wells of the lower deck, so that a mid-section of the upper deck is between the wheel-wells of the lower deck and a forward elevated section of the lower deck so as to be immediately above and resting on the mid-section of the lower deck.

8 Claims, 10 Drawing Sheets

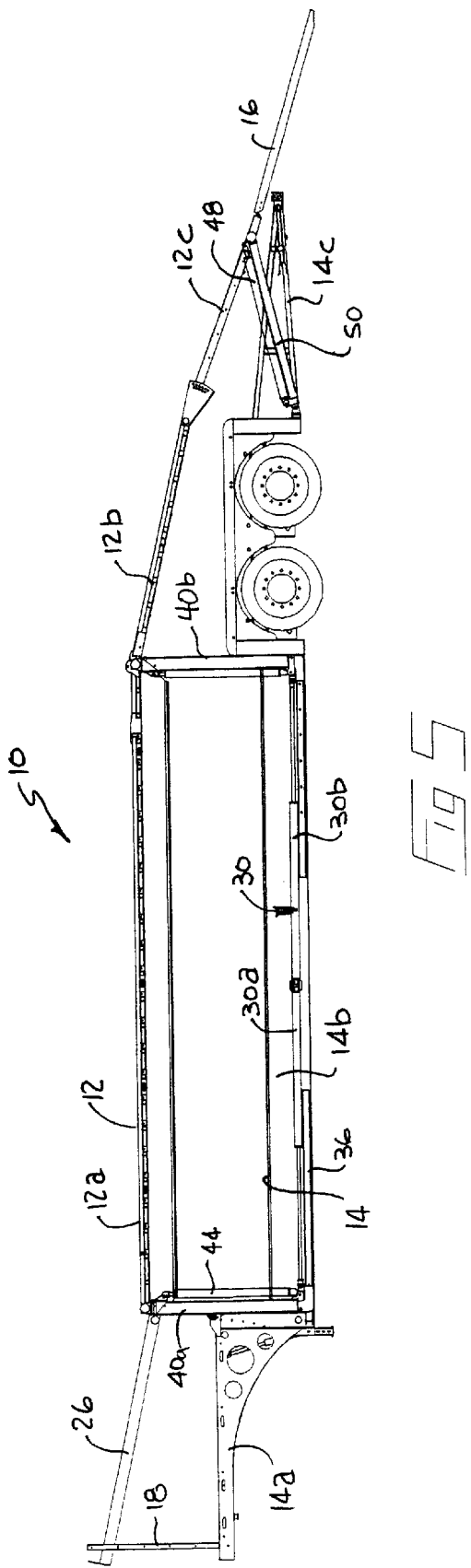

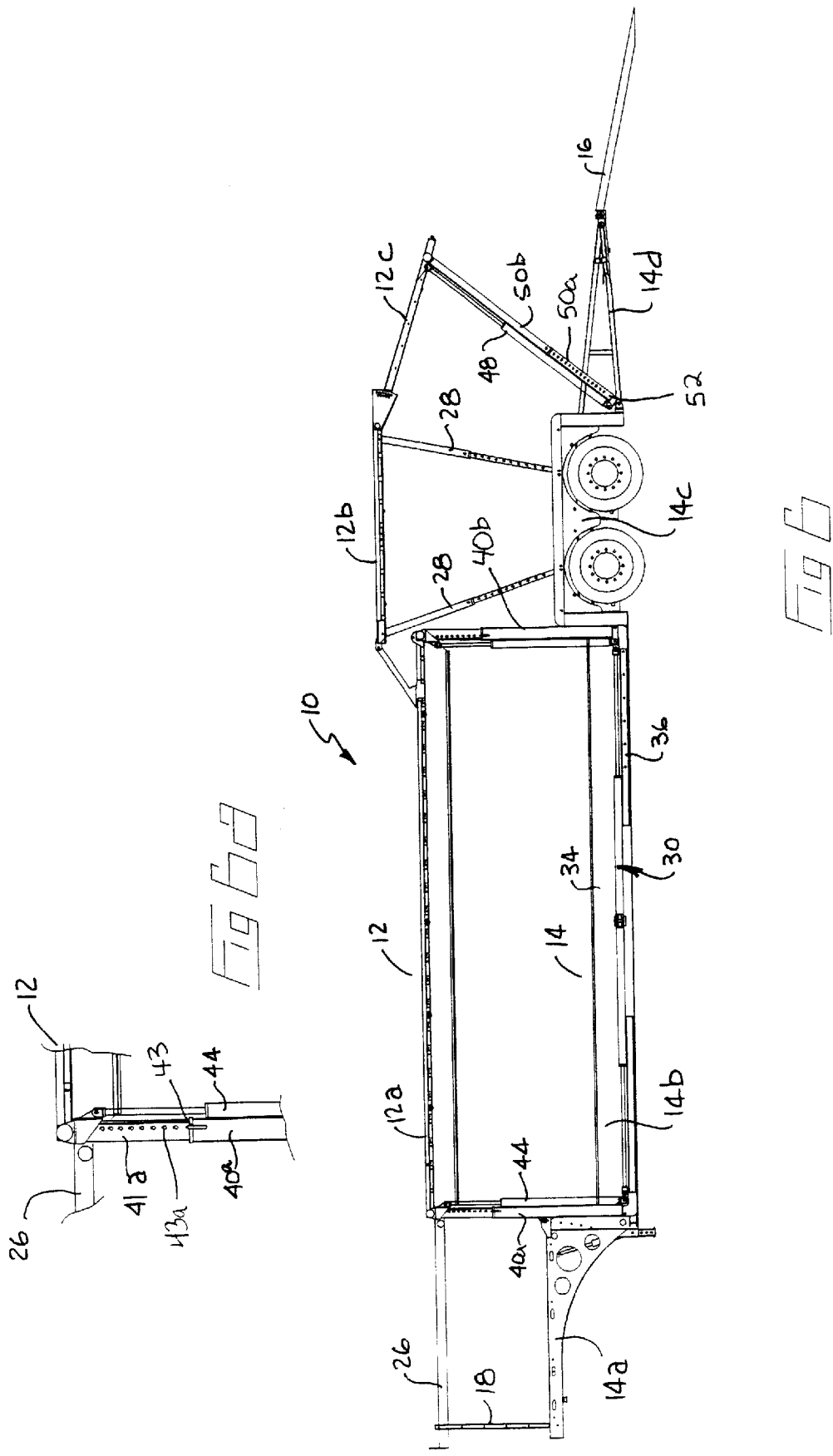

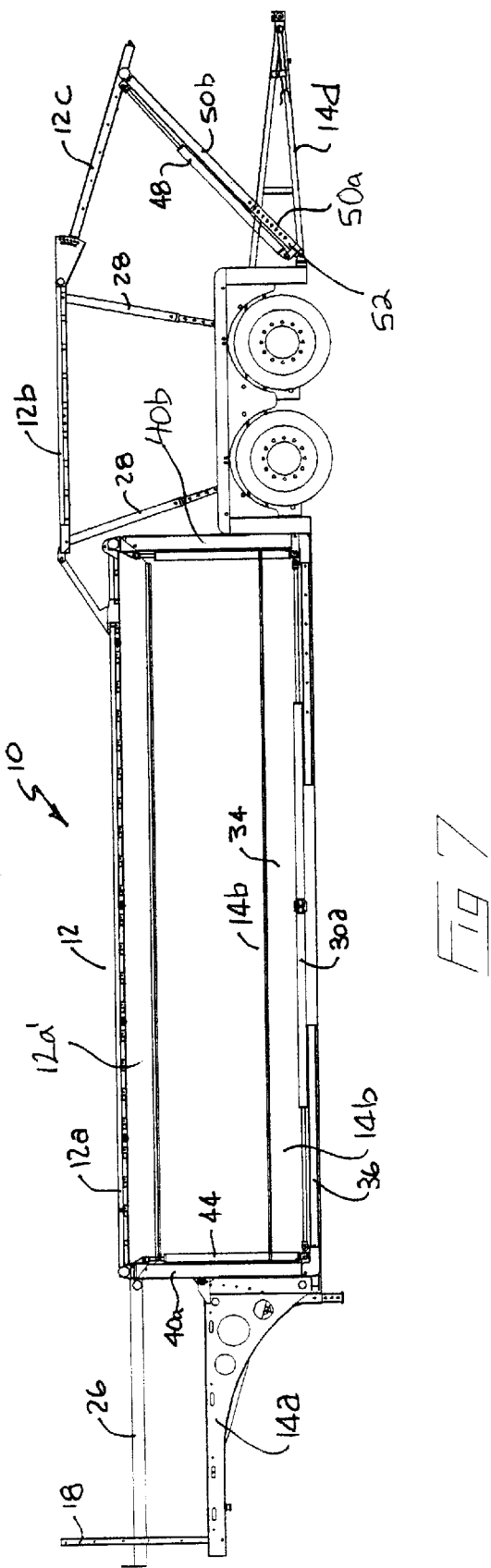

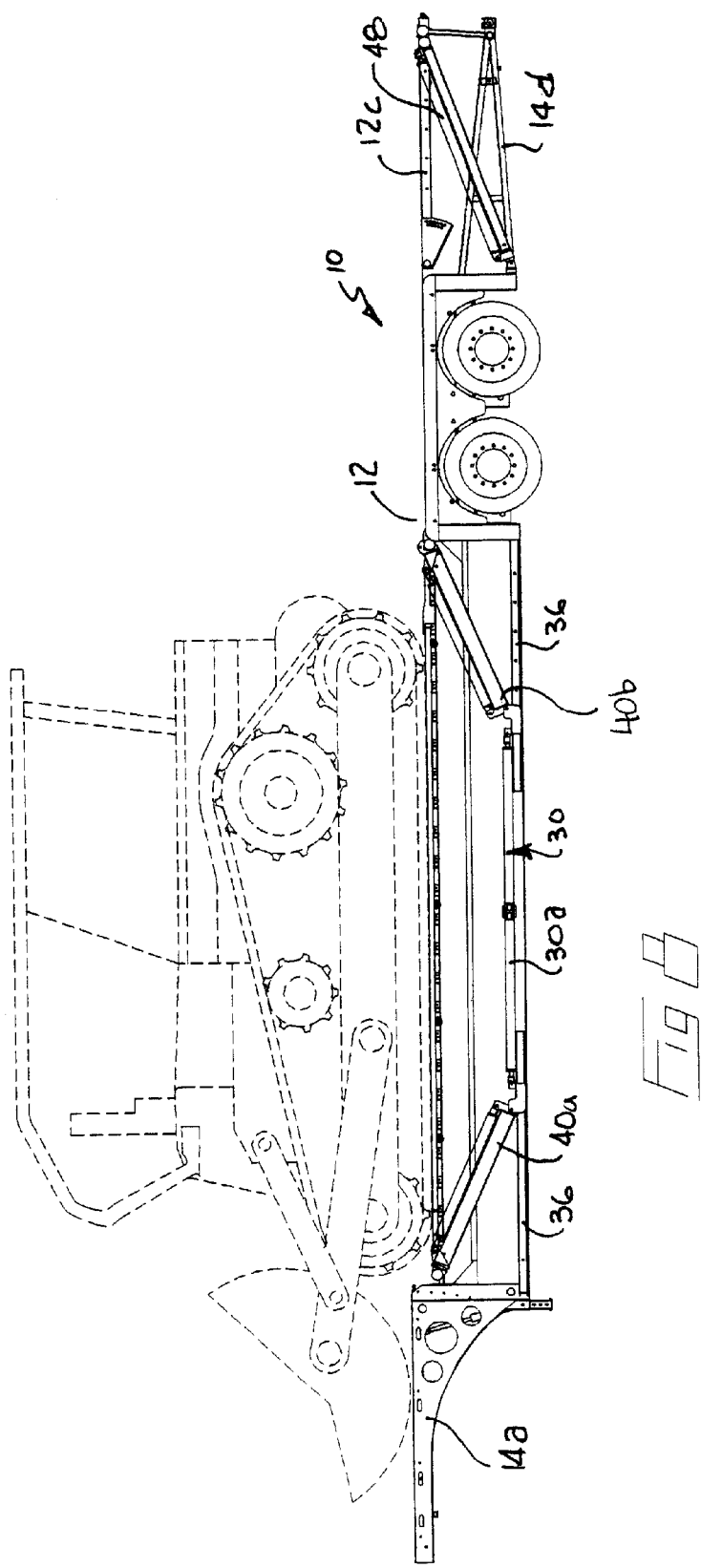

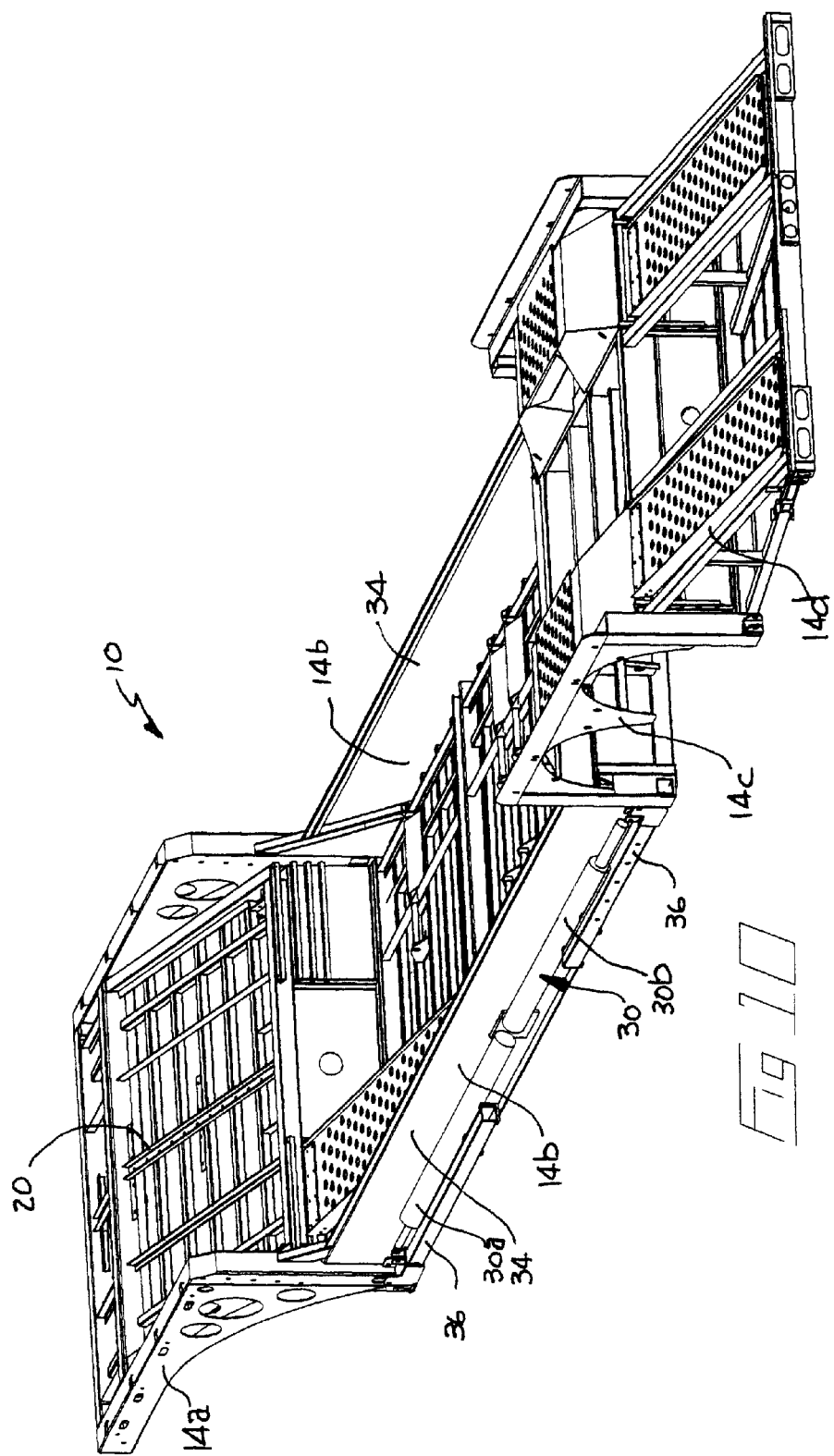

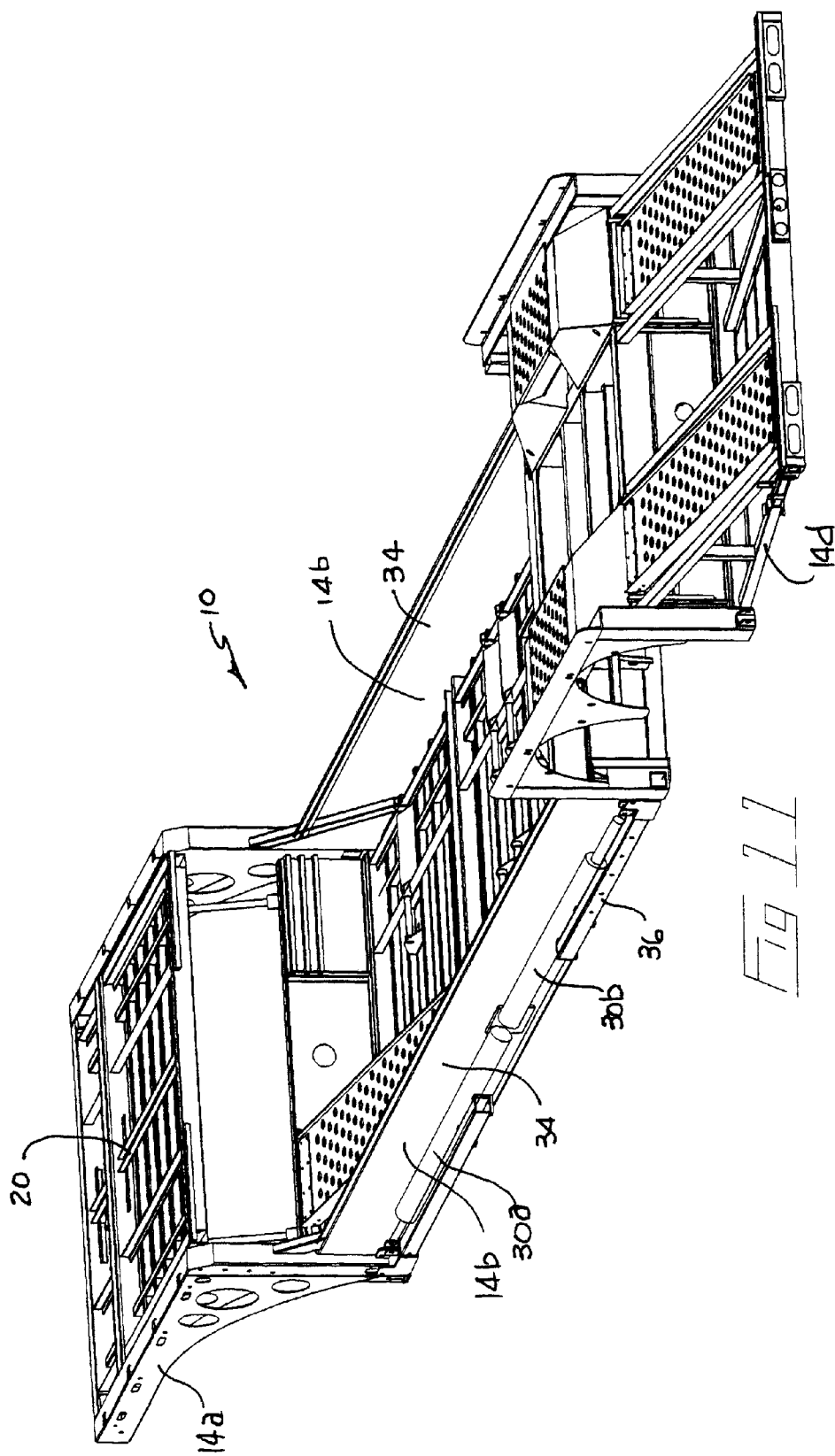

CONVERTIBLE VEHICLE TRANSPORTING TRAILER

CROSS REFERENCE TO RELATED APPLICATION

This application claims priority from U.S. Provisional Patent Application No. 60/220,177 filed Jul. 24, 2000 entitled Convertible Vehicle Transporting Trailer.

FIELD OF THE INVENTION

This invention relates to an automobile transporting trailer having spaced apart lower and upper decks, upon which automobiles may be positioned for transportation, and where the uppermost deck is repositionable relative to the lower deck, from a spaced apart position to a fully retracted position, allowing the trailer to be converted for transporting cargo other than automobiles.

BACKGROUND OF THE INVENTION

Transportation of automobiles on trailers specifically designed for this purpose is well known. Generally, such trailers have a lower and upper decks which support a number of vehicles on each deck. The upper deck on most trailers can be slightly raised from a lower or loading position to an upper or transporting position. Vehicles are usually driven on to the upper deck over stowable ramps and articulatable deck portions when the upper deck of the trailer is in the lower or loading position. This lower or loading position helps minimize the incline of the loading ramps. Once the upper deck is loaded, it is elevated to the upper or transporting position which provides sufficient clearance for vehicles to be loaded onto the lower deck.

The prevalent disadvantage to the design of such trailers is that on backhaul, without cargo, they must be transported singly in a vertically extended position since they either cannot be fully collapsed or loaded one on top of the other. Further, the present design of such trailers does not make the transportation of goods normally transported by flatbed highway trailers practicable.

As stated by Blodgett in U.S. Pat. No. 4,786,222, the degree of success achieved by a multi-purpose truck depends to a large extend on how compactly the automobile storage deck assembly can be stored when it is not in use. In addition, acceptance of such a truck is affected to a large degree by how easily the truck can be converted from one carrying mode to the other. It is an object of the present inventing to provide a convertible trailer which is compact when in a flat-deck trailer mode, and which may be quickly and easily converted between the flatdeck trailer mode and a double-decker vehicle carrying mode, and which is capable of carrying very heavy freight when in the flat-deck trailer mode.

Applicant is also aware of U.S. Pat. No. 5,332,345 which issued to Lillard on Jul. 26, 1994 for a Vehicle Carrier. Lillard discloses articulatable upper and lower vehicle platforms mounted to a common chassis. An array of upper vehicle platforms are disposed along the length of the chassis, mounted over a corresponding array of lower vehicle platforms. When the upper platforms are adjacent. It is not taught nor suggested that the upper platforms rest or bear on the rails of the chassis along the length of the platforms.

SUMMARY OF THE INVENTION

The present invention is a convertible cargo transporting trailer. The trailer has lower and upper decks disposed in vertically spaced apart general parallel alignment. The upper deck can be extended above the lower deck from a fully retracted position, where the upper deck is nested on the lower deck, to an intermediately extended position, where loading of the upper deck is facilitated, to a fully extended position to accommodate loading of the lower deck. Once loading of the trailer is completed, the overall vertical distance between the upper deck and vehicles positioned on the lower deck surface may be adjusted by slightly lowering the mid portion of the upper deck into a suitable transportation position.

The upper deck, when in its fully retracted position, can be utilized for the transportation of heavy equipment and cargo and in an intermediately extended position can be utilized for the transportation of palletized or containerized goods and equipment on each of the decks.

Put another way, my invention includes an upper rigid deck and a lower rigid deck, wherein the upper deck is selectively elevatable by elevating means so as to actuate between an upwardly extended position and a lowered position. In the upwardly extended position the upper deck is sufficiently elevated over the lower deck for carrying cargo such as automobiles on the lower deck. In the lowered position the upper deck fits so as to nest onto the lower deck thereby forming a unitary single deck cargo carrier.

In summary, the convertible vehicle transporting trailer of the present invention includes rigid upper and lower decks. The upper deck is mounted onto the lower deck by selectively actuable, releasably lockable telescopic stanchions. The stanchions are actuable by actuators so as to raise and lower the upper deck over the lower deck between a lowered position, an intermediately elevated position, and a fully elevated position.

In the fully extended position the upper deck is elevated above the lower deck so as to allow loading of vehicles or freight onto the lower deck. In the intermediately elevated position the upper deck is below the fully elevated position so as to be snugly adjacent uppermost extremities of the vehicles or freight on the lower deck.

In the lowered position the upper deck rests on a mid-section of the lower deck and on elevated wheel-wells of the lower deck, so that a mid-section of the upper deck, forward of a wheel-well covering section of the upper deck, is between the wheel-wells of the lower deck and a forward elevated section of the lower deck so as to be immediately above and resting on the mid-section of the lower deck extending between the wheel-wells and the forward elevated section. In this position an upper surface of the wheel-well covering section of the upper deck is substantially co-planar with an upper-most surface of the mid-section of the upper deck.

In the lowered position, longitudinally extending, parallel, elongate side girders of the upper deck extend from their lower girder edges resting on upper-most surfaces of correspondingly aligned and correspondingly elongate side girders of the lower deck, to an upper deck floor of the mid-section of the upper deck, that is, the side girders are of sufficient height, so that the upper deck floor of the mid-section is substantially co-planar with an upper deck floor of the wheel-well covering section. Thus heavy loads carried on the mid-portion of the upper deck cause the side girders of the upper deck to bear against and along the side girders of the lower deck. Similarly, heavy loads carried on the wheel-well covering section of the upper deck cause the wheel-well covering section of the upper deck to bear against the wheel-wells of the lower deck.

A floor of the lower deck extends between the side girders of the lower deck, in one preferred embodiment between the lower edges of the side girders. A floor of the upper deck extends between the upper deck side girders, in one preferred embodiment between the upper edges of the side girders.

A rearmost downwardly inclined section of the lower deck is mounted to the wheel-wells. A rearmost ramp section of the upper deck is mounted to the wheel-well covering section. In one preferred embodiment the rearmost ramp section is pivotally mounted to a rear edge of the wheel-well covering section and a rear actuator is mounted between the lower deck and the ramp section for selectively pivoting the ramp section relative to the wheel-well covering section. Thus when the upper deck is in the lowered position, the ramp section may be pivoted so as to be substantially co-planar with the upper deck floor of the wheel-well covering section. As with the other actuators, the rear actuator is releasably lockable so as to releasably lock the ramp section relative to the wheel-well covering section.

Advantageously the forward elevated section of the lower deck has a selectively inclinable ramp, selectively inclinable between a declined position which allows driving a vehicle from the mid section of the lower deck onto the forward elevated section, and a substantially horizontal position for carrying cargo on the forward elevated section.

Further advantageously, forwardly extendable floor members are slidably telescopically mounted in a forward end of the mid section of the upper deck for forwardly extending the upper deck over the forward elevated section of the lower deck. Rigid supports are pivotally mounted to the forward elevated section for pivoting between a lowered stowed position and an elevated, preferably vertical, position for releasable mounting to forward ends of the floor members.

In one preferred embodiment the actuators for actuating the stanchions comprise a longitudinally aligned oppositely disposed pair of actuators mounted on each of the side girders of the lower deck. Opposite ends of the oppositely disposed pair of actuators are pivotally mounted to lower ends of the forward and rear mid-section stanchions. The lower ends of the forward and rear mid-section stanchions are slidably mounted in oppositely disposed guides mounted on the side girders of the lower deck. The guides cooperate with each of the oppositely disposed pair of actuators. The upper ends of the forward and rear mid-section stanchions are pivotally mounted to corresponding forward and rear ends of the mid section of the upper deck. Thus, extending the actuators drives the lower ends of the stanchions oppositely along the guides, and rotates the forward and rear mid-section stanchions into preferably vertically oriented alignment.

In one aspect of the present invention the wheel-well covering section of the upper deck is pivotally mounted to the mid section of the upper deck. Thus in the embodiment wherein the wheel-well covering section is supported when elevated above the wheel-wells by non-actuable telescopic stanchions, the wheel-well section may be elevated, at least in part, by elevating the rear end of the mid section of the upper deck.

BRIEF DESCRIPTION OF THE DRAWINGS

FIG. 5 is a side elevation of the trailer in the intermediately elevated, or upper deck loading position.

FIG. 6 is a side elevation of the trailer in the fully elevated, or lower deck loading position.

FIG. 6a is an enlarged view of an end of a typical telescopic stanchion in the extended position.

FIG. 7 is a side elevation of the trailer in the transportation position.

FIG. 8 is a side elevation of the trailer where the upper and lowermost decks are in the nested position with heavy equipment positioned thereon.

FIG. 9 is a side elevation of the trailer where the upper deck is shown in the intermediately elevated position relative to the lowermost deck with palletized or containerized goods and equipment shown thereon.

FIG. 10 is an isometric view of a portion of the trailer, with upper deck removed, illustrating the articulated forward portion of the lower deck in the lowered position.

FIG. 11 is an isometric view of a portion of the trailer, with upper deck removed, illustrating the articulated forward portion of the lower deck in the raised position.

DETAILED DESCRIPTION OF EMBODIMENTS OF THE INVENTION

Figure 1:
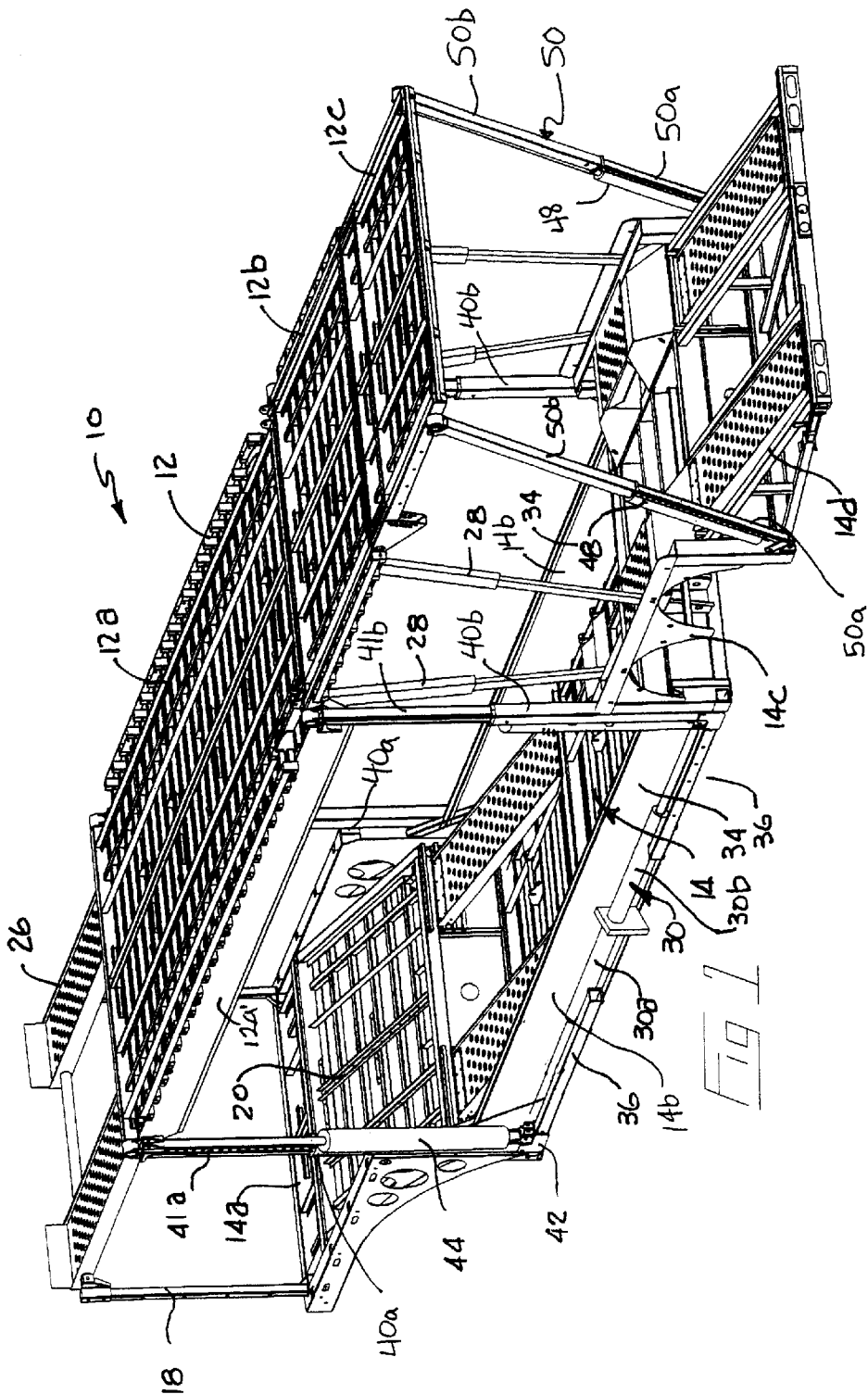
FIG. 1 is an isometric view of the automobile transporting trailer of the present invention in the fully extended position.

As illustrated in the accompanying figures, automobile transporting trailer 10 has upper and lower decks 12 and 14 respectively, each separately capable of supporting automobiles or light trucks or a combination thereof. Trailer 10 is intended to be conveyed on a highway when pulled by a motorized truck-tractor vehicle (not illustrated).

Lower deck 14 has an elevated forward end 14a, a rigid mid body section 14b supported by side girders 34, a wheel-well section 14c and a rigid tail section 14d.

The forward end 14a of trailer 10 is mountable onto a fifth wheel connection (not shown) of the truck-tractor vehicle. Rotatable posts 18 are hinged to forward end 14a so as to be pivotable from a horizontal position nested in forward end 14a to a vertical position. Forward end 14a also has a hydraulically articulatable forward ramp 20 as better seen in FIGS. 1, 10 and 11 which permits a portion of a leading vehicle positioned on lower deck 14 to be supported well forward on the trailer.

Upper deck 12 has a rigid mid section 12a supported by side girders 12a', a hinged intermediate wheel well section 12b and an articulatable rear deck portion 12c. Mid section 12a has forwardly extendible ramps 26 which telescopically extend from mid section 12a so that when fully extended they engage and are releasably mounted to posts 18 on forward end 14a, when posts 18 are in their vertical position.

Figure 4:
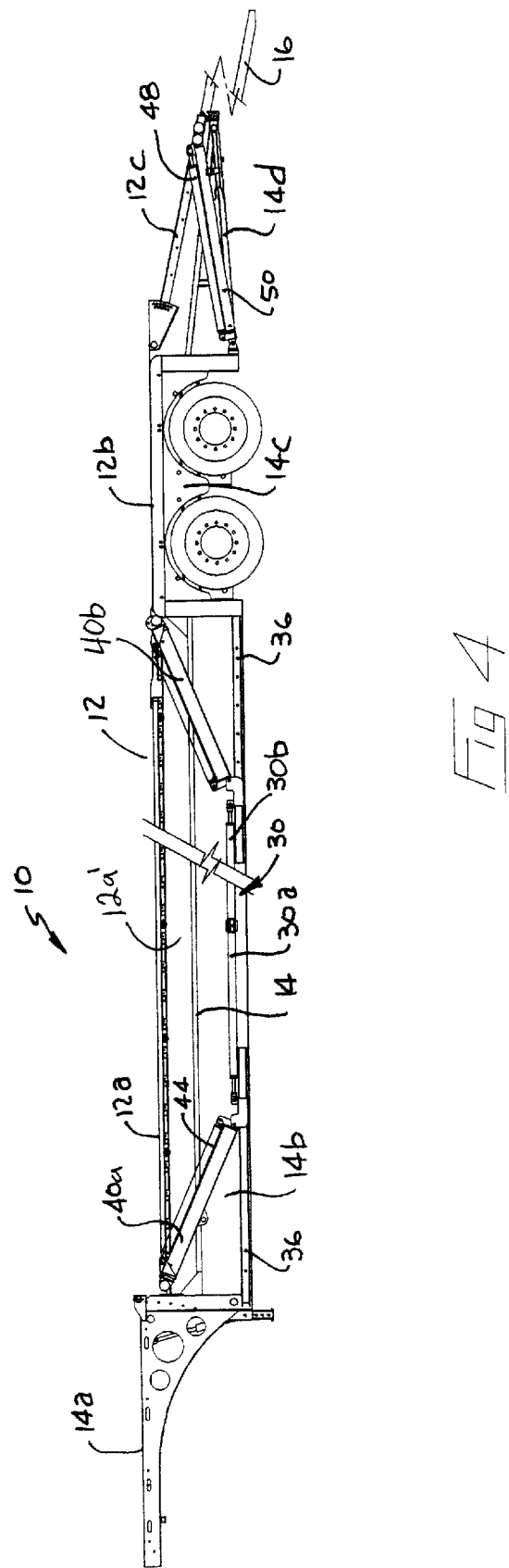
FIG. 4 is a side elevation of the trailer of the present invention in the lowermost nested position.
Figure 4:
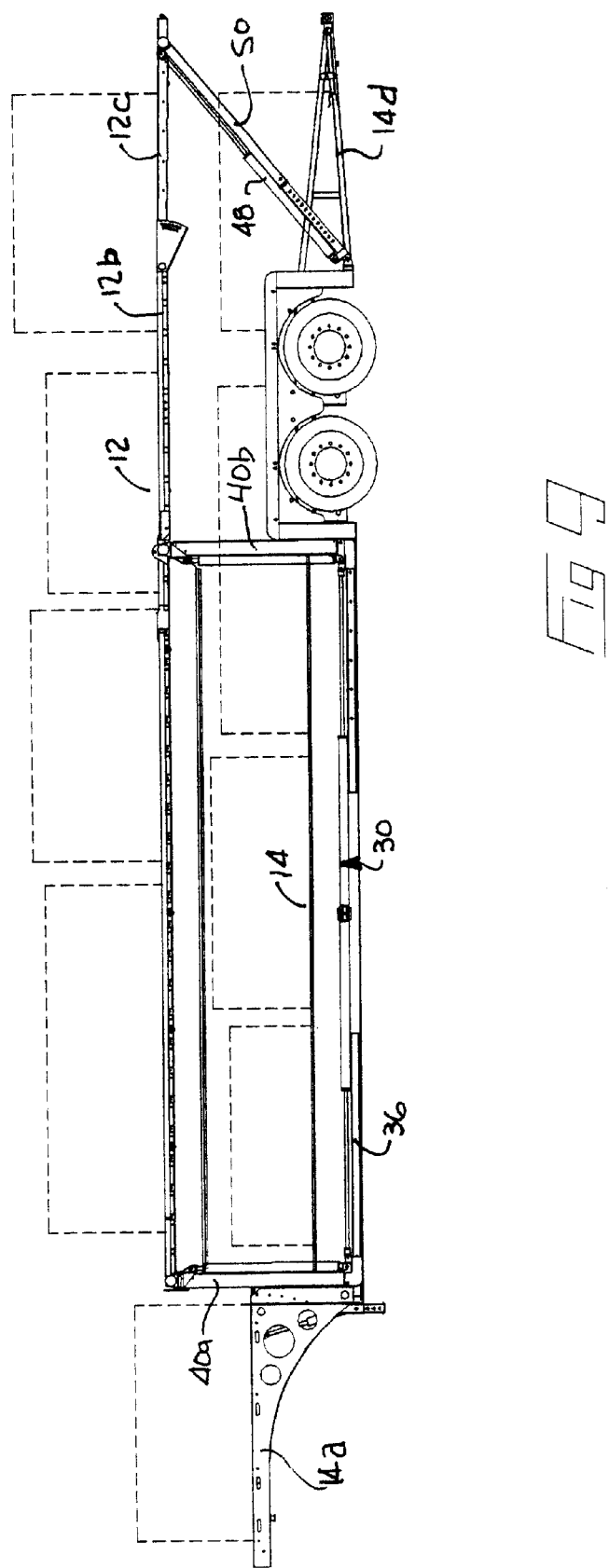

In the lowermost or nested position shown in FIG. 4, mid section 12a and hinged intermediate wheel well section 12b lie in relatively horizontal substantially co-planar alignment. Mid section 12a closely fits on top of mid body section 14b of lower deck 14. Hinged wheel-well section 12b overlays and nests into the wheel well section 14c. This provides a flat deck trailer for hauling cargo on a return leg, after carrying vehicles on an initial leg of a trip, or vice-versa. The nesting of the upper deck into the lower deck provides for the emulation of a flat deck trailer after conversion from the vehicle double-decker trailer mode to the low-profile flat deck trailer mode.

The sections of the upper deck are vertically repositionable relative to the lower deck, as may be seen by referring to FIGS. 1, 5 and 6, by a plurality of hydraulic cylinders, better described below, which selectively telescopically adjust the length of their corresponding stanchions. The stanchions can be pinned in their extended positions so as to remain extended in the event of loss of hydraulic pressure.

In operation it is preferable that the opposite ends of mid section 12a of the upper deck 12 be raised sequentially. First, the forward end of mid section 12a is elevated. Next, the rear end of mid section 12a is elevated. Then the articulatable rear deck section 12c is raised and with it hinged wheel-well section 12b. Such sequencing prevents binding and twisting of sections and allows for the inspection and accurate positioning of all sections. Wheel-well section 12b is supported in the elevated position by telescopic stanchions 28 which are fixed as by pinning at the desired length and mounted to wheel well section 14c of lower deck 14.

Figure 2:
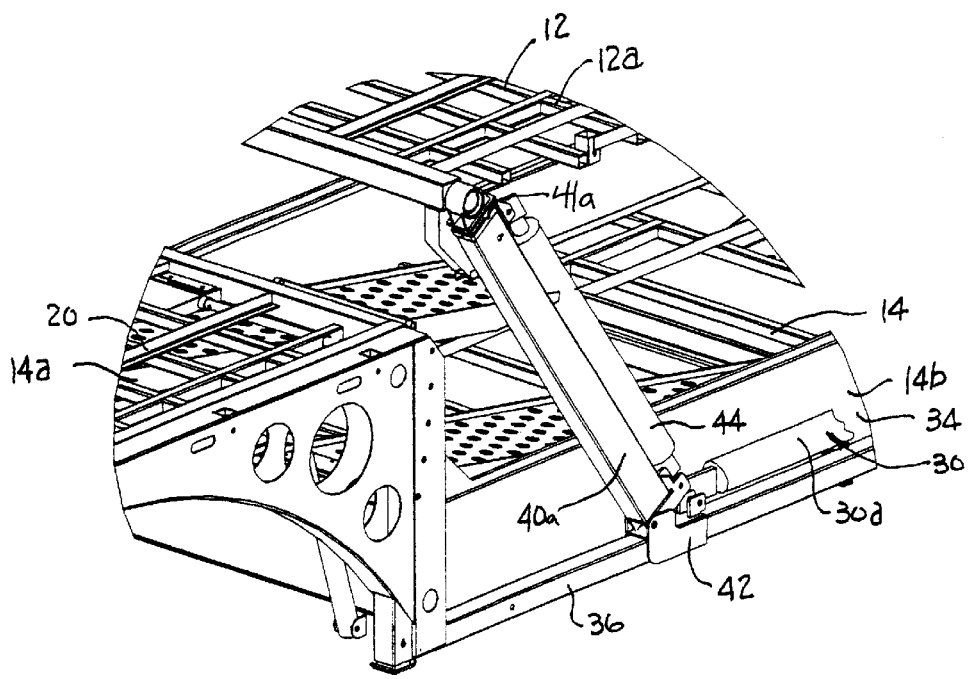
FIG. 2 is an isometric view of a portion of the trailer illustrating the forward portion of the upper deck lifting mechanism.
Figure 3:
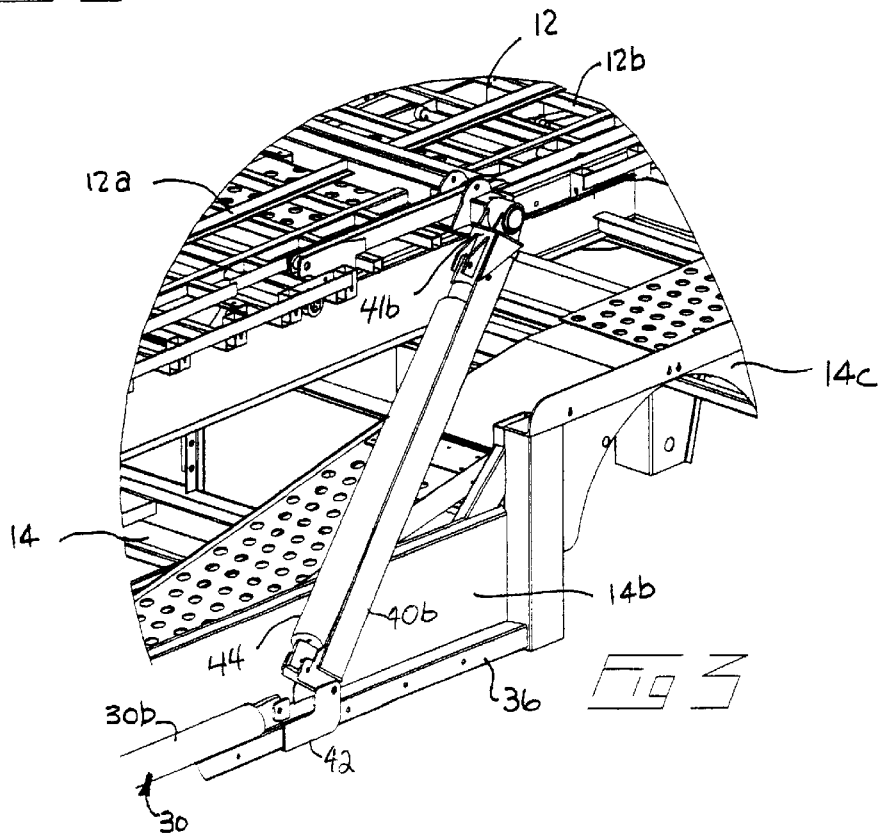
FIG. 3 is an isometric view of a portion of the trailer illustrating the rearward portion of the upper deck lifting mechanism.

To achieve such a sequential operation, in one preferred embodiment a pair of horizontally opposed, longitudinally aligned hydraulic cylinders 30 are fixedly mounted on each side of trailer 10 outboard of, and at the mid point of, parallel side girders 34 of lower deck 14. Also mounted to side girders 34 are elongated guide members 36 as better seen in FIGS. 2 and 3. When forward cylinder 30a of the pair of cylinders 30 is extended, the forward telescopic stanchions 40a are rotated into a generally vertical position. Similarly, when rearward cylinder 30b is extended, the rearward telescopic stanchions 40b are rotated to the vertical. Stanchions 40a and 40b are pivotally mounted at their lower ends to brackets 42 slidably mounted on guides 36. Their opposite ends are pivotally mounted to corners of mid section 12a of upper deck 12. Once rotated to the vertical, stanchions 40a and 40b are pinned to lower trailer deck 14 to prevent accidental rotational movement of the stanchions as would occur if the hydraulic pressure in cylinders 30 released. Once rotated into their vertically upright positions, telescopic stanchions 40a and 40b elevate mid section 12a to an upper deck loading elevation as seen in FIG. 5.

The front and rear telescopic stanchions 40a and 40b are then further vertically extendible as seen in FIG. 6a by hydraulic cylinders 44. Cylinders 44 extend between slidable brackets 42 and telescopically extendible, slidably mounted, telescoping members 41a and 41b mounted in stanchions 40a and 40b respectively. As seen in FIG. 6, this increases the space available between the upper and lower decks as may be required when loading the lower deck.

Members 41a and 41b are pinned to their corresponding stanchions 40a and 40b by inserting pins 43 through holes 43a in members 41a and 41b.

Supporting posts 18 are rotated to the vertical and mounted at their upper ends to the distal ends of ramps 26, when the ramps have been extended. Ramps 26 are normally telescopically nested within the forward end of mid section 12a of upper deck 12. When needed they are slid forwardly, outwardly from mid section 12a, so as to mount on a cross member extending between supporting posts 18.

Articulated rear deck section 12c is rotated by operation of hydraulic cylinders 48. Cylinders 48 are mounted to rear stanchions 50. Stanchions 50 are telescopic. Their telescoping members 50a may be pinned to the stanchion sleeves 50b to secure deck section 12c in its position for example as a sloped access ramp to the upper deck. Pins are inserted through holes in sleeves 50b and through, for each telescoping member, one of a plurality of longitudinally spaced apart apertures 52 so as to prevent unintended collapse. Attachment of stowable ramps 16 to rear deck section 12c provides continuous access from the roadway onto the upper deck as can best be seem in FIG. 5.

Loading of the lower deck 14 requires that the upper deck 12 and the articulatable rear deck section 12c now be raised sufficiently to provide clearance for vehicles which must be driven on to lower deck 14. This is achieved by actuation of hydraulic cylinders 44 and 48 which telescope stanchions 40a, 40b and 50 respectively.

Once the lower deck is loaded, the upper deck may be lowered to a convenient transporting height, as depicted in FIG. 7, to thereby reduce the center of gravity of the trailer and make the load more stable at highway speeds.

With the sections of the upper deck in the lowermost position, that is, in contact with, or nested into, the sections of lower deck, as may be seen in FIGS. 4 and 8 and described above, the trailer is converted to a flat deck trailer (referred to herein as the flat-deck trailer mode) available for transporting heavy equipment or construction materials. This substantially increases the versatility of what was in the prior art a single use trailer. Further, due to the low profile of trailer 10 with upper deck 12 in its lowermost position it is possible to 'piggy-back' one or more such trailers on a back-haul trip.

In the flat-deck trailer mode the mid section of the trailer can support a heavy load because the upper deck side girders rest on the lower deck side girders and therefore the load is distributed along the length of the lower deck mid section increasing the load bearing capacity of the mid section by the combined web heights of the upper and lower side girders. The upper deck side girders are of sufficient height so that the top of the upper deck mid section is coplanar with the upper deck wheel-well covering section when the upper deck is lowered. The weight on the wheel-well covering section bears on the lower deck wheel-wells to distribute the load. A heavy load bearing capacity flat-deck trailer extending the length of at least the combined lengths of the mid section and wheel-well covering section is thereby obtained.

With the rearmost, that is, the ramp section of the upper deck elevated to, and secured at, the horizontal when the trailer is in the flat-deck trailer mode, the flat-deck length is extended by the length of the ramp section, as can best be seen in FIG. 8.

As may be seen in FIG. 9, the upper and lower decks of trailer 10 may be loaded with palletized or containerized goods and equipment. The upper deck 12 may be suitably lowered after loading of the lower deck 14 to a convenient height for highway travel.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A convertible vehicle transporting trailer comprising:
   a rigid lower deck,
   a rigid upper deck mounted onto said lower deck by selectively actuable telescopic stanchions,
   said stanchions actuable by actuators so as to raise and lower said upper deck over said lower deck between a lowered position, an intermediately elevated position, and a fully elevated position, wherein in said fully extended position said upper deck is elevated above said lower deck so as to allow loading of vehicles or freight onto said lower deck, wherein in said intermediately elevated position said upper deck is below said fully elevated position so as to be snugly adjacent uppermost extremities of said vehicles or freight on said lower deck, wherein in said lowered position said upper deck rests on a mid-section of said lower deck and on elevated wheel-wells of said lower deck, so that a mid-section of said upper deck, forward of a wheel-well covering section of said upper deck, is rested between said wheel-wells of said lower deck and a forward elevated section of said lower deck so as to be immediately above and resting on said mid-section of said lower deck extending between said wheel-wells and said forward elevated section, an upper surface of said wheel-well covering section of said upper deck substantially co-planar with an upper-most surface of said mid-section of said upper deck, longitudinally extending, parallel, elongate side girders of said upper deck extending from their lower girder edges resting on upper-most surfaces of correspondingly aligned and correspondingly elongate side girders of said lower deck, to an upper deck floor of said mid-section of said upper deck so that said upper deck floor of said mid-section is substantially co-planar with an upper deck floor of said wheel-well covering section wherein heavy loads carried on said mid-portion of said upper deck cause said side girders of said upper deck to bear against and along said side girders of said lower deck and heavy loads carried on said wheel-well covering section of said upper deck cause said wheel-well covering section of said upper deck to bear against said wheel-wells of said lower deck, a floor of said lower deck extending between said side girders of said lower deck, a rearmost downwardly inclined section of said lower deck mounted to said wheel-wells, and a rearmost ramp section of said upper deck mounted to said wheel-well covering section.

2. The trailer of claim 1 wherein said rearmost ramp section is pivotally mounted to a rear edge of said wheel-well covering section, a rear actuator mounted between said lower deck and said ramp section for selectively pivoting said ramp section relative to said wheel-well covering section wherein, when said upper deck is in said lowered position, said ramp section may be pivoted so as to be substantially co-planar with said upper deck floor of said wheel-well covering section, said rear actuator releasably lockable so as to releasably lock said ramp section relative to said wheel-well covering section.

3. The trailer of claim 1 wherein said forward elevated section of said lower deck has a selectively inclinable ramp selectively inclinable between a declined position allowing for driving a vehicle from said mid section of said lower deck onto said forward elevated section, and a substantially horizontal position for carrying cargo on said forward elevated section.

4. The trailer of claim 1 further comprising forwardly extendable floor members telescopically mounted in a forward end of said mid section of said upper deck for forwardly extending said upper deck over said forward elevated section of said lower deck.

5. The trailer of claim 4 further comprising rigid supports pivotally mounted to said forward elevated section for pivoting between a lowered stowed position and an elevated position for releasable mounting to forward ends of said floor members.

6. The trailer of claim 1 wherein said actuators for actuating said stanchions comprise a longitudinally aligned oppositely disposed pair of actuators mounted on each of said side girders of said lower deck, opposite ends of said oppositely disposed pair of actuators pivotally mounted to lower ends of forward and rear mid-section stanchions, said lower ends of said forward and rear mid-section stanchions slidably mounted in oppositely disposed guides mounted on said side girders of said lower deck, said guides cooperating with each of said oppositely disposed pair of actuators, upper ends of said forward and rear mid-section stanchions pivotally mounted to corresponding forward and rear ends of said mid section of said upper deck wherein extending said actuators drives said lower ends oppositely along said guides, and rotates said forward and rear mid-section stanchions into vertically oriented alignment.

7. The trailer of claim 1 wherein said wheel-well covering section of said upper deck is pivotally mounted to said mid section of said upper deck.

8. The trailer of claim 7 wherein said wheel-well covering section is supported elevated above said wheel-wells by non-actuable telescopic stanchions and wherein said wheel-well covering section is elevated by elevating said rear end of said mid section of said upper deck.

* * * * *